Oct. 13, 1970    A. MICHELSON    3,533,137
MOLDING MACHINE

Filed Sept. 25, 1967    3 Sheets-Sheet 1

INVENTOR.
ANATOL MICHELSON
BY
Meyer, Tilberry & Body
ATTORNEYS

Oct. 13, 1970  A. MICHELSON  3,533,137
MOLDING MACHINE
Filed Sept. 25, 1967  3 Sheets-Sheet 2
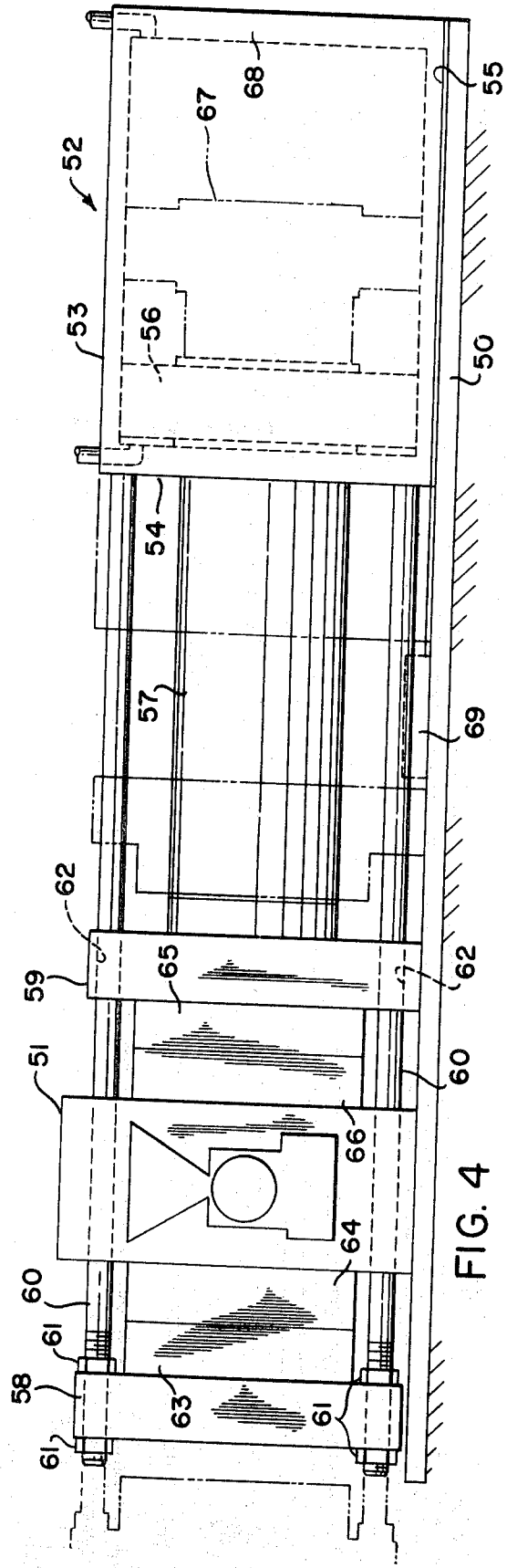
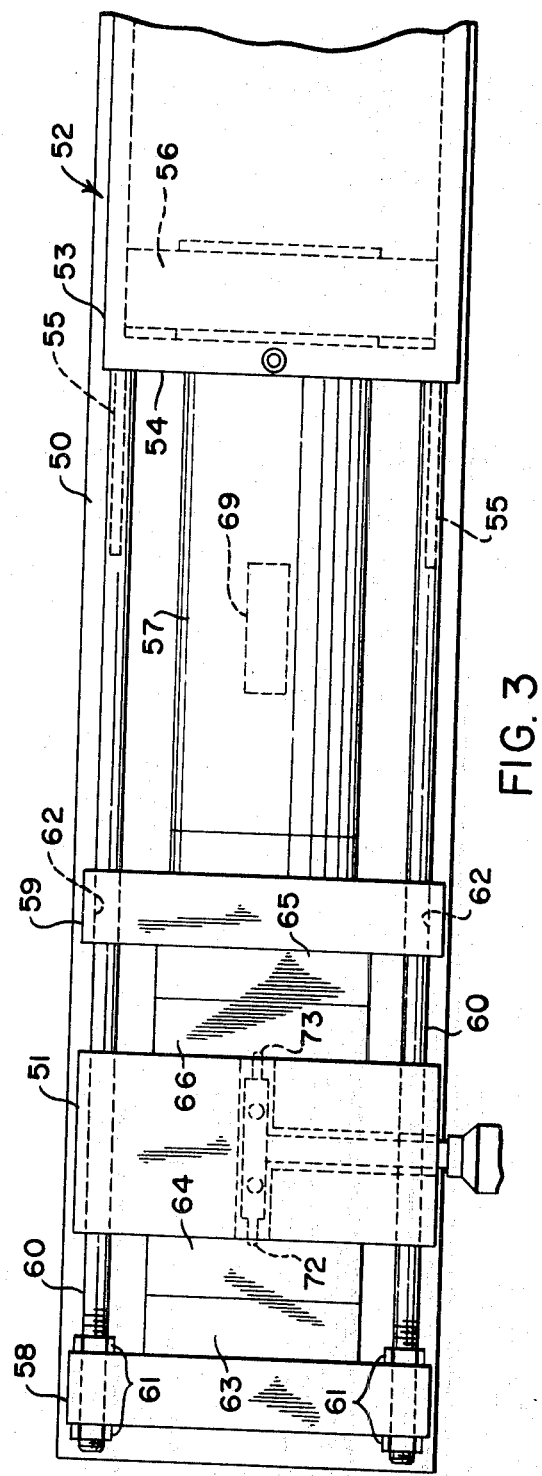
INVENTOR.
ANATOL MICHELSON
BY
Meyer, Tilberry & Body
ATTORNEYS Oct. 13, 1970  A. MICHELSON  3,533,137
MOLDING MACHINE Filed Sept. 25, 1967  3 Sheets-Sheet 3

INVENTOR.
ANATOL MICHELSON
BY
Meyer, Tilberry & Body
ATTORNEYS

United States Patent Office 3,533,137
Patented Oct. 13, 1970

3,533,137
MOLDING MACHINE
Anatol Michelson, Glenolden, Pa., assignor, by mesne assignments, to Gulf & Western Industrial Products Company, Grand Rapids, Mich., a corporation of Delaware
Filed Sept. 25, 1967, Ser. No. 670,120
Int. Cl. B29f 1/00
U.S. Cl. 18—30    9 Claims

ABSTRACT OF THE DISCLOSURE

A base supports a stationary platen with tie rod means slidably supported on the platen and a first movable platen on one side of the stationary platen and a second movable platen on the other side of the stationary platen. In one embodiment both movable platens are fixedly secured to the rods while in the other embodiment only one movable platen is secured to the rods. A double acting hydraulic cylinder actuates the two movable platens; in the first embodiment the hydraulic cylinder is secured to the base and connected to one of the movable platens while in the second embodiment the hydraulic cylinder is slidably supported on the base and connected both to the tie rods and to one movable platen.

---

This invention relates to molding machines and more particularly to an injection molding press.

Although the invention is described in connection with an injection molding system it is to be appreciated that the invention may be employed with any kind of molding machinery useable in die casting, mold casting, thermoplastic molding or any other process of this type.

Prior art molding machines traditionally have employed only one die set or mold for each machine. The typical prior art machine also is so arranged that the stroke for opening and closing the dies or mold occurs in a substantially horizontal plane. Because of these prior art approaches to molding machines, certain problems and limitations have resulted. Thus, only a relatively low productivity has been obtainable with machines using only one die set or mold and attempts to increase the capacity by using multiple die sets have resulted in complex, expensive machinery. Moreover, because of the horizontal orientation of such machines, a relatively large floor area is required for each machine installation to accommodate the stroke of the actuating piston. It is the primary object of this invention to provide a molding machine which overcomes both of these aforementioned shortcomings in the prior art.

More particularly, it is an object of this invention to provide a molding machine which is capable of higher productivity than was possible with the prior art machines.

It is a further object of this invention to provide a molding machine of relatively simple construction which employs more than one die set or mold for each machine.

It is another object of this invention to provide a molding machine which may be vertically oriented thereby reducing the floor area requirements for each machine.

It is still another object of this invention to provide a molding machine having a single fixed platen cooperating with two movable platens to form two die sets with a single hydraulic cylinder used to actuate both movable platens.

More specifically, this invention contemplates a molding machine having a fixed platen positioned intermediate a pair of movable platens mounted for simultaneous reciprocation toward and away from the fixed platen. The movable platens are reciprocated by a single double acting hydraulic cylinder and piston. In one embodiment of the invention the piston is directely connected to one of the movable platens and the cylinder is connected by tie rods to the other platen with one of the movable platens being secured to the tie rods while the other movable platen is slidably received over the tie rods. In the other embodiment of the invention the two movable platens are both secured to the tie rods with the piston of the cylinder being connected to one of the movable platens. In the first embodiment both movable platens are moved simutlaneously to a closed position while in the second embodiment one movable platen is moved to an open position while the other movable platen is being moved to a closed position.

In the drawings wherein like reference numerals indiacte like parts in the various views:

FIG. 3 is a top plan view of an alternate embodiment of the molding machine.

FIG. 4 is a side elevation view of the molding machine of FIG. 3.

Figure 1:
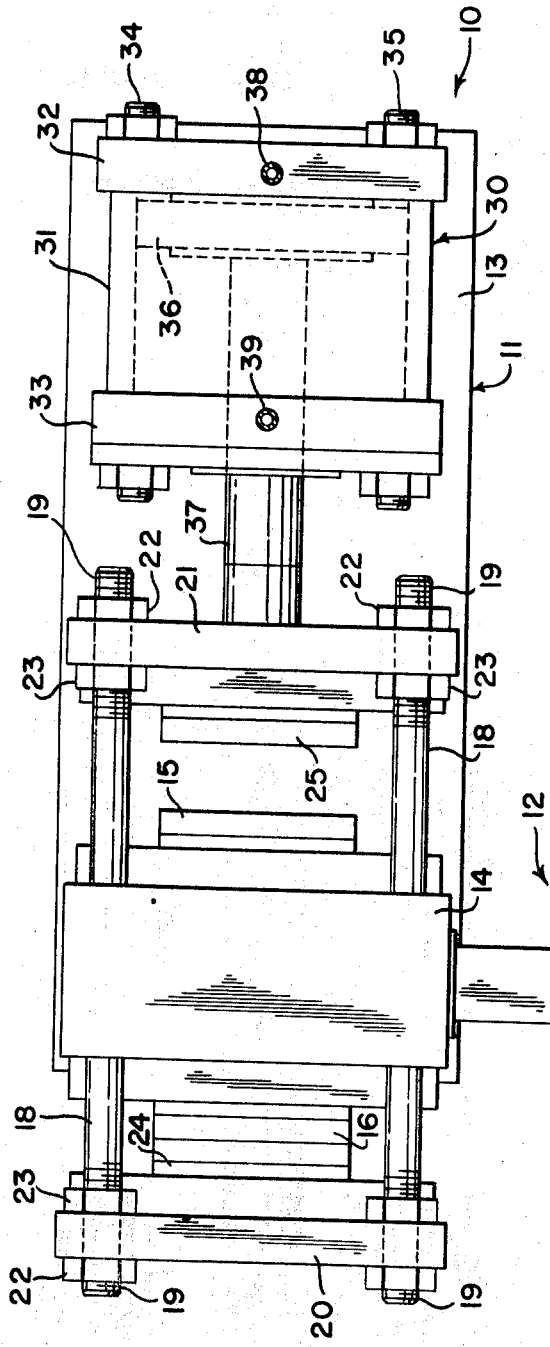
FIG. 1 is a top plan view of the molding machine incorporating the principles of this invention.
Figure 2:
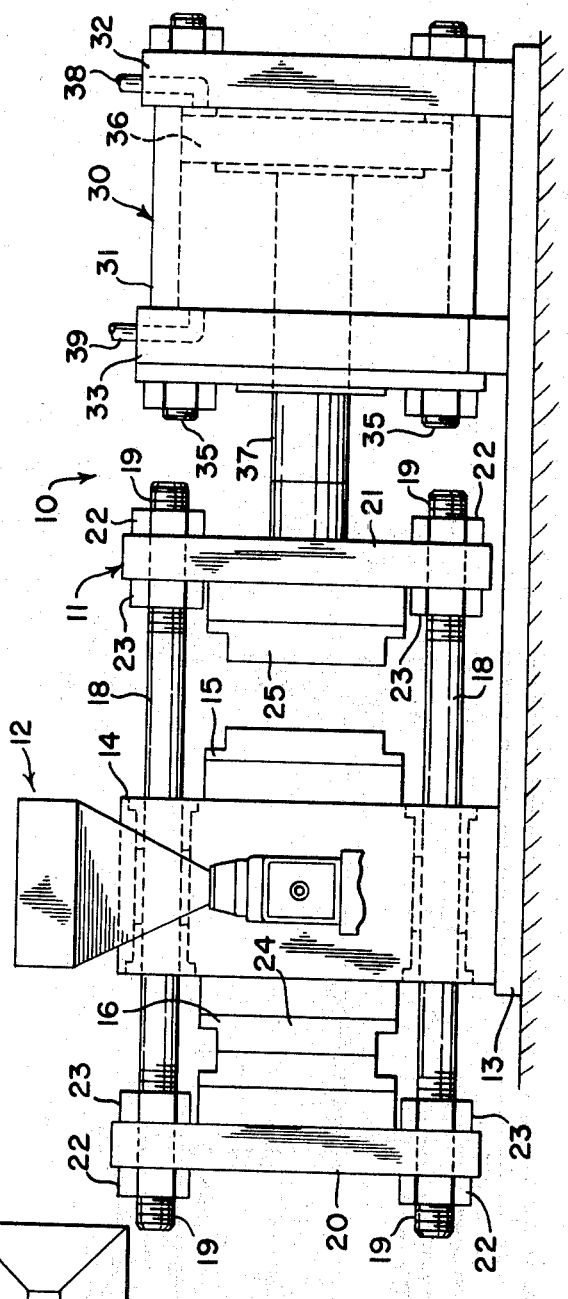
FIG. 2 is a side elevation view of the molding machine of FIG. 1.

Referring now to FIG. 1 there is illustrated the preferred embodiment of the molding machine indicated generally by the reference numeral 10. The machine normally includes the press portion 11 together with conventional ancillary equipment such as an ejection system which is not shown. The machine 10 is particularly adapted for use with an injection molding system which is illustrated in schematic form and indicated generally by the reference numeral 12. The injection system as such forms no part of this invention.

The machine comprises a base frame or support 13 on which there is supported a stationary platen 14. The platen 14 provides the passages for the injection system, as will be appreciated by those having ordinary skill in the art.

The platen 14 supports on opposed sides thereof one half of two mold sets. Thus, there is on the right-hand side of the platen 14, as viewed in FIG. 1, mold half 15 while on the left side of the platen 14 there is the mold half 16. Slidably passing through apertures in platen 14 are four tie rods 18. The opposite ends of the rods 18 are threaded as at 19 and receive thereover movable platens 20 and 21. Suitable means such as nuts 22, 23 secure the platens 20, 21 in spaced relation along the length of the rods 18 and on opposite sides of platen 14. The platen 20 is adapted to receive the mold half 24 which cooperates with the mold half 16 while the platen 21 is adapted to receive the mold half 25 which cooperates with the mold half 15. With this arrangement there are provided between the three platens 14, 20, 21 two die sets which may be simultaneously employed when the machine is operated.

To actuate the movable platens 20, 21 there is provided a double acting hydraulic cylinder indicated generally by the reference numeral 30. The cylinder comprises a cylinder housing 31 with spaced end plates 32, 33 secured together by threaded bolts 34, 35. A piston 36 having a piston rod 37 projecting through the end plate 33 is disposed within the cylinder housing 31. Suitable inlet and outlet apertures 38, 39 are provided in the end plates 32, 33 for the introduction of hydraulic pressure to the interior of the cylinder housing. The external end of the piston rod 37 is secured to the platen 21 for movement therewith so that as the rod 37 is reciprocated, the platen 21 and its accompanying unit, comprising rods 18 and platen 20, is also reciprocated.

It will be appreciated that the above described mechanism functions to control simultaneously the opening and closing movements of the two die sets. Thus, as hydraulic pressure is introduced into the aperture 38 the pressure forces the piston 36 to the left as viewed in FIG. 1. Because of the interconnection between the piston rod 37 and the platen 21, the platen 21 is also moved to the left; however, the platen 21 and the platen 20 are interconnected by the rods 18 to forme a unit so that as the platen 21 is moved to the left so also the platen 20 is moved to the left. As the mold half 25 carried by the platen 21 engages the cooperating mold half 15 to close the right-hand die set the mold half 24 carried by the platen 20 is spaced from the mold half 16 to open the left-hand die set. The injection system employed with this machine will, of course, be such that the mold material will be injected only into the die set which is closed.

The alternate embodiment illustrated in FIGS. 3 and 4 illustrates a molding machine of a construction similar in operation to that of FIG. 1 but in which the two die sets are closed simultaneously. Thus, the molding machine includes a base or frame 50 on which there is supported a stationary platen 51. A double acting hydraulic cylinder 52 similar in construction to the hydraulic cylinder illustrated in the embodiment of FIG. 1 is provided. The hydraulic cylinder includes a cylinder housing 53 with end plates 54, 68 having suitable means formed therein for the introduction of hydraulic fluid into the interior of the cylinder. The hydraulic cylinder 52 is supported on ways 55 in the frame 50 for sliding movement relative to the frame 50. The cylinder further includes a piston 56 with a piston rod 57 projecting through the end plate 54.

Disposed on opposite sides of the fixed or stationary platen 51 are movable platens 58, 59, both of which are supported on rods 60 slidably received in apertures in the platen 51. The rods 60 are threaded at the left-hand end, as viewed in FIG. 4, with the platen 58 secured by suitable nuts 61 to the end of the rods. The other ends of the rods 60 are secured to the hydraulic cylinder housing. The other movable platen 59 has apertures 62 formed therein through which rods 60 are slidably received. As in the embodiment of FIG. 1, two separate die sets are provided with the platen 58 supporting mold half 63 while the left side of the fixed platen 51 carries a cooperating mold half 64. Similarly, the movable platen 59 supports mold half 65 with the right side of fixed platen 51 carrying a cooperating mold half 66.

With the above described device it is apparent that as hydraulic pressure is introduced into the cylinder 52, with the parts in the position shown in FIG. 4, the pressure will cause the piston 56 to be displaced to the position shown in dotted lines 67. However, the pressure acts equally against the inner surface of the end plate 54 and causes the cylinder housing 53 to be displaced to the left along the ways 55 in the frame 50 to the dotted line position shown in FIG. 4. As the piston 56 is displaced to the dotted line position it carries with it the mold half 59 which slides along the rods 60 toward the cylinder. Simultaneously, the rods 60 are displaced to the left along with the cylinder housing and carry with them the movable platen 58. It is apparent that this displacement of the movable platen 59 to the right and the movable platen 58 to the left causes a simultaneous separation of the two die sets.

To assure that both die sets are separated an equal amount, there is provided on the frame 50 of the machine an abutment or half stroke positioner 69 which lies in the path of travel of both the movable platen 59 and the cylinder housing 53. The positioner 69 is placed midway between the platen 59 and end plate 54 so that if, for any reason, the cylinder housing and platen move with different speeds the first one to abut the positioner 69 will thereafter be prevented from further travel with the additional travel then being accomplished by the other of the two elements.

It will be appreciated that introduction of hydraulic pressure through the other of the fluid passages will cause a reversal in operation and the two die sets will be closed. While the die sets are closed suitable injection nozzles 72, 73, schematically illustrated in FIG. 3, may be employed to introduce the material into the interior of the molds.

It will be appreciated that the productive capacity of the molding machines illustrated in FIGS. 1 and 4 is significantly greater than the capacity of prior art machines through utilization of two die sets controlled by a single hydraulic cylinder. Moreover, it should be noted that this increased capacity is achieved in a machine of relatively simple construction. Thus, unlike prior art machines that have attempted to use two die sets, this machine uses but a single fixed platen which forms a part of both die sets. Although the two movable platens are disposed on opposite sides of the fixed platen, the particular arrangement described requires but a single cylinder to operate both platens. The two machines also illustrate the versatility of this arrangement in that the die sets either may be opened simultaneously, as in the embodiment of FIG. 4, or opened alternately as is the case with the embodiment of FIG. 4, or opened alternately as is the case with the embodiment of FIG. 1. In addition, this arrangement permits either vertical or horizontal orientation of the machine thus achieving the objective of minimizing the floor area requirements.

Figure 6:
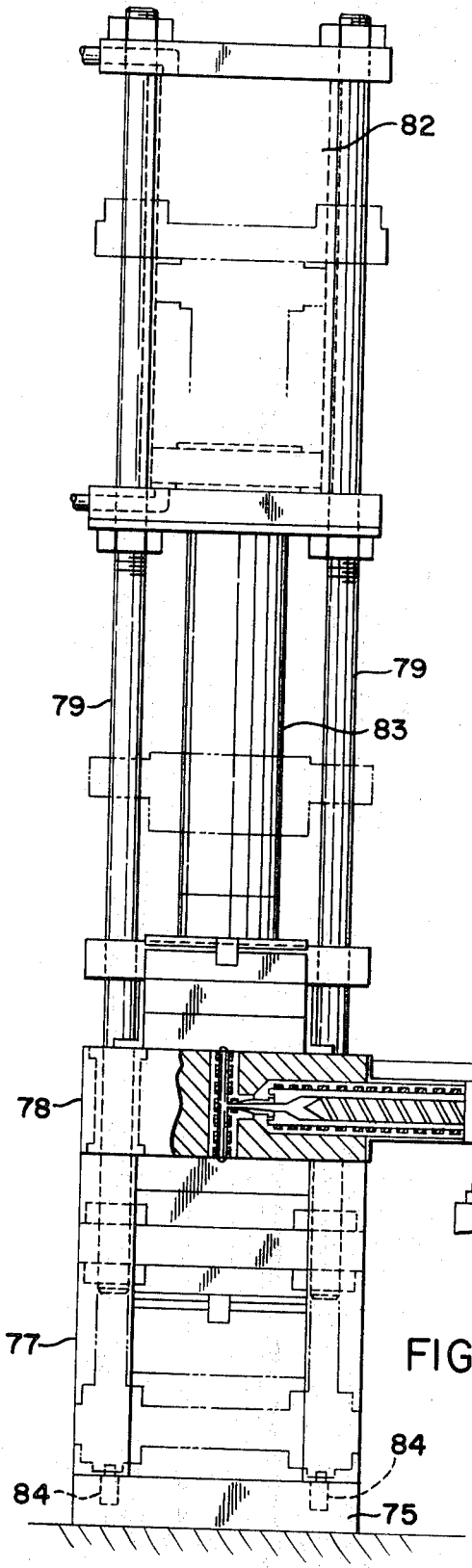
FIG. 6 is a side elevation view of the molding machine of FIG. 5.
Figure 5:
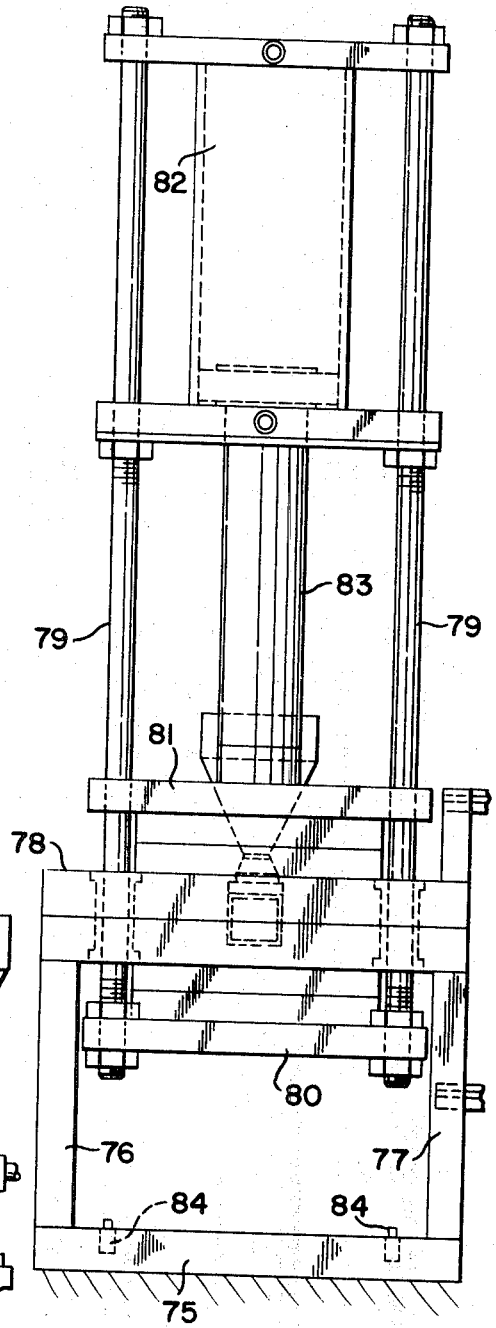
FIG. 5 is an elevation view of a molding machine incorporating the principles of this invention with the molding machine in a vertical orientation.

Illustrated in FIGS. 5 and 6 is an arrangement in which the molding machine is in a vertical orientation. In this arrangement there is provided a base frame 75 with vertically extending side supports 76, 77 on which the fixed platen 78 rests. Vertically extending rods 79 slidably extend through the platen 78 with a movable platen 80 being threadedly secured to the lower end of the rods 79 in the manner of the embodiment in FIGS. 3 and 4. On the opposite side of the platen 78 is a movable platen 81 which is slidably received over the rods 79. A double acting hydraulic cylinder 82 of a construction similar to the cylinder in FIGS. 3 and 4 is provided with the piston rod 83 being secured to the platen 81. The machine described in FIGS. 5 and 6 operates in a manner identical to that of the machine in FIGS. 3 and 4 with the exception that the stroke is in the vertical direction rather than the horizontal direction with both die sets being opened with one stroke of the piston and closed on the reverse stroke. Dampers 84 are provided in the base of the frame 75 to engage the ends of the rods 79 as the rods are reciprocated.

Although the invention has been discussed in connection with certain embodiments it is to be understood that these disclosed embodiments are not intended to limit the scope of the present invention as defined in the following claims.

Having thus described my invention, I claim:

1. A molding machine comprising:
a frame,
a stationary platen fixedly mounted on said frame,
rod means slidably supported on said platen,
a first movable platen on one side of said stationary platen and a second movable platen on the other side of said stationary platen,
each of said first and second platens being supported on said rod means with at least one of said movable platens being secured to said rod means for movement therewith,
actuating means for said movable platens with one of said movable platens being interposed between said actuating means and said fixed platen, and
means interconnecting said actuating means with said first and second platens for substantially simultaneous movement relative to said fixed platen.

2. The machine of claim 1 wherein said actuating means comprises a double acting hydraulic cylinder.

3. The machine of claim 2 wherein both of said movable platens are secured to said rods for movement therewith; said hydraulic cylinder including a piston rod connected to one of said movable platens.

4. The machine of claim 2 wherein said first of said movable platens is slidably received over said rod means,
means interconnecting said rod means with said cylinder,
said cylinder further including a piston rod connected to said first of said platens, and
means supporting said cylinder on said frame for movement therealong.

5. The machine of claim 4 wherein said frame includes positioning means interposed between said first of said movable platens and said cylinder;
said positioning means being in the path of travel of both said movable platen and said cylinder.

6. The machine of claim 1 wherein said frame includes support means spacing said stationary platen above said frame; said rod means extending vertically through said stationary platen.

7. The machine claim 1 wherein said actuating means is operative to move one of said movable platens toward said fixed platen while substantially simultaneously moving the other of said movable platens away from said fixed platen.

8. The machine of claim 1 wherein said actuating means is operative to move both of said movable platens toward said fixed platen substantially simultaneously.

9. The machine of claim 1 wherein said first of said movable platens is slidably received over said rod means, said interconnecting means including means connecting said actuating means with said rod means whereby said actuating means is operable to move said first movable platen along said rod means in one direction while displacing said rod means in an opposite direction.

References Cited

UNITED STATES PATENTS

| | | |
|---|---|---|
| Re. 18,202 | 9/1931 | Polak. |
| 2,331,015 | 10/1943 | Dawes et al. _____ 18—16 |
| 2,555,476 | 6/1951 | Du Bois et al. _____ 18—30 |
| 3,063,092 | 11/1962 | Fischer _____ 18—30 X |
| 3,224,043 | 12/1965 | Lameris et al. _____ 18—30 |

FOREIGN PATENTS

| | | |
|---|---|---|
| 569,791 | 1/1959 | Canada. |
| 1,066,731 | 10/1959 | Germany. |
| 1,103,012 | 3/1961 | Germany. |

J. SPENCER OVERHOLSER, Primary Examiner

M. O. SUTTON, Assistant Examiner

U.S. Cl. X.R.

18—16